US009884386B2

(12) United States Patent
Arndt et al.

(10) Patent No.: US 9,884,386 B2
(45) Date of Patent: Feb. 6, 2018

(54) WELDING PROCESS FOR THE WELDING OF ALUMINUM

(71) Applicant: Robert Bosch GmbH, Stuttgart (DE)

(72) Inventors: Volker Arndt, Erbach (DE); Juergen Haeufgloeckner, Schneeberg (DE); Michael Ripper, Beerfurth (DE)

(73) Assignee: Robert Bosch GmbH, Stuttgart (DE)

( * ) Notice: Subject to any disclaimer, the term of this patent is extended or adjusted under 35 U.S.C. 154(b) by 690 days.

(21) Appl. No.: 14/140,361

(22) Filed: Dec. 24, 2013

(65) Prior Publication Data
US 2014/0183168 A1    Jul. 3, 2014

(30) Foreign Application Priority Data

Dec. 27, 2012   (DE) .......................... 10 2012 025 200

(51) Int. Cl.
B23K 9/12         (2006.01)
B23K 11/25        (2006.01)
B23K 11/11        (2006.01)
B23K 11/18        (2006.01)

(52) U.S. Cl.
CPC .......... B23K 11/255 (2013.01); B23K 11/115 (2013.01); B23K 11/185 (2013.01)

(58) Field of Classification Search
CPC .... B23K 11/255; B23K 11/256; B23K 11/257
USPC .. 219/86.1, 86.31, 86.41, 86.51, 86.61, 86.7
See application file for complete search history.

(56) References Cited

U.S. PATENT DOCUMENTS

| 4,442,337 | A | * | 4/1984 | Nakata | ................. | B23K 11/255 |
| | | | | | | 219/110 |
| 4,503,312 | A | * | 3/1985 | Nakata | ................. | B23K 11/255 |
| | | | | | | 219/110 |
| 4,596,917 | A | * | 6/1986 | Nied | ................... | B23K 11/3009 |
| | | | | | | 219/109 |
| 5,558,785 | A | * | 9/1996 | Killian | ................. | B23K 11/253 |
| | | | | | | 219/110 |
| 6,072,145 | A | * | 6/2000 | Suita | ..................... | B23K 11/311 |
| | | | | | | 219/110 |

(Continued)

FOREIGN PATENT DOCUMENTS

DE           10060055 A1 *  6/2002  .......... B23K 11/255
DE       102008005113 A1 * 10/2009  .......... B23K 11/115

*Primary Examiner* — Quang D Thanh
*Assistant Examiner* — Ayub Maye
(74) *Attorney, Agent, or Firm* — Maginot, Moore & Beck LLP

(57) ABSTRACT

A welding process for the welding of aluminum includes a force sensor measuring a force between two welding electrodes on aluminum elements to be welded and transmitting its measured values to a welding control. Until the elapse of a set welding time, the welding control calculates and stores at least one absolute value and/or at least one increase in the measured force. The welding control compares the measured absolute value and/or the increase in the measured force with a reference value and/or a reference curve and calculates a control deviation from the comparison. After the elapse of the set welding time, the welding control subjects the welding electrodes to a constant current during a welding time extension that follows the set welding time, dependent on a magnitude of the control deviation that is measured at the point in time of the elapse and/or during the set welding time.

11 Claims, 2 Drawing Sheets

(56) References Cited

U.S. PATENT DOCUMENTS

| | | | | |
|---|---|---|---|---|
| 7,432,466 B2* | 10/2008 | Spinella | ............... | B23K 11/252 |
| | | | | 219/110 |
| 7,655,880 B2* | 2/2010 | Auger | .................. | B23K 11/255 |
| | | | | 219/110 |
| 8,153,921 B2* | 4/2012 | Pieterman | .............. | B23K 31/12 |
| | | | | 219/117.1 |
| 8,513,560 B2* | 8/2013 | Takahashi | ............. | B23K 11/115 |
| | | | | 219/86.25 |
| 9,314,878 B2* | 4/2016 | Abou-Nasr | .......... | B23K 31/125 |
| 2010/0072176 A1* | 3/2010 | Numano | ................ | B23K 11/115 |
| | | | | 219/108 |
| 2012/0118861 A1* | 5/2012 | Haeufgloeckner | ..... | B23K 11/11 |
| | | | | 219/91.1 |
| 2013/0248505 A1* | 9/2013 | Anayama | ............. | B23K 11/115 |
| | | | | 219/130.01 |

* cited by examiner

WELDING PROCESS FOR THE WELDING OF ALUMINUM

This application claims priority under 35 U.S.C. §119 to patent application no. DE 10 2012 025 200.5 filed on Dec. 27, 2012 in Germany, the disclosure of which is incorporated herein by reference in its entirety.

BACKGROUND

The disclosure relates to a welding process for the welding of aluminum, in which at least one force sensor measures a force between two welding electrodes on aluminum elements to be welded and transmits its measured values to a welding control. Up to the elapse of a set welding time, the welding control thereby calculates in each case during and/or after the elapse of predeterminable incremental time frames at least one absolute value and/or at least one increase in the measured force and stores it, the welding control comparing the measured absolute value and/or the increase in the measured force in each case with a reference value and/or a reference curve and calculating a control deviation resulting from the comparison.

Welding processes of the generic type are already known for the welding of steel. In such welding processes, the welding control may therefore for example monitor various welding parameters and in particular control a supply of current to the welding electrodes. Such welding processes that are already known cannot however be applied to the special needs of the welding of aluminum. In comparison with steel, aluminum has considerable physical and chemical differences. For example, aluminum differs from steel in the respective melting temperature, which in the case of steel is approximately 1500° C. and in the case of aluminum is approximately 660° C. Consideration must similarly be given to a high-melting oxide film (melting temperature at approximately 2040° C.), which envelops the aluminum parts to be welded together and hinders the welding. In addition, aluminum has a thermal conductivity that is approximately four times higher in comparison with steel. The higher thermal conductivity may have the effect that particularly rapid heat dissipation takes place in particular at the points to be welded, that is to say the welding points, as a result of which structural cracks and/or air inclusions can occur for example at or in the region of the welding points. In other words, such welding processes that are designed for the welding of steel but are used for the welding of aluminum lead to welding points of low quality, and to this extent have for example inadequate strength and/or structural damage.

An object to be achieved is therefore that of providing a welding process for the welding of aluminum that makes it possible for aluminum to be welded particularly easily and inexpensively while avoiding the aforementioned problems.

SUMMARY

One way in which the disclosure now provides a welding process for the welding of aluminum that makes it possible for aluminum to be welded particularly easily and inexpensively is to make use of the idea that the welding control is provided and designed such that, after the elapse of a set welding time, it subjects the welding electrodes to a current of a constant level during a welding time extension that follows on from the set welding time, dependent on a magnitude of the control deviation that is measured at the point in time of the elapse and/or during the set welding time.

In this case, "set welding time" denotes that welding time period that corresponds to a predeterminable welding time, for example a minimum or ideal welding time, of steel.

By means of the introduction of a welding time extension following on from the set welding time, the welding points not yet corresponding to a certain quality after the elapse of the set welding time are additionally re-welded. In this case, the quality of the welding points may be measured on the basis of the force between the two welding electrodes measured by the force sensor. Such a welding time extension therefore leads for example to a thickening, that is to say strengthening, of the welding points. In this case, the magnitude of the control deviation, that is to say the magnitude of the deviation for example from an absolute value of the measured force, which is an indication of the quality of the respective welding points, from for example a reference value, which is preferably to be regarded as an ideal value, is a measure of the length of the welding time extension. In particular, the rule may apply that, the greater such a control deviation is, the longer the welding time extension also is. To this extent, such re-welding is used to increase and optimize the quality of the respective welding points in each case after the elapse of the set welding time, that is to say re-work them. With such a welding process, therefore, aluminum can be welded particularly easily and inexpensively by way of the welding control described herein.

According to at least one embodiment, the welding process for the welding of aluminum comprises at least one force sensor, which measures a force between two welding electrodes on aluminum elements to be welded and transmits its measured values to a welding control, wherein, up to the elapse of a set welding time, the welding control calculates in each case during and/or after the elapse of predeterminable incremental time frames at least one absolute value and/or at least one increase in the measured force and respectively stores it. The welding control in each case compares the measured absolute value and/or the increase in the measured force with a reference value and/or a reference curve and calculates a control deviation resulting from the comparison. In this case, the welding control is provided and designed such that, after the elapse of the set welding time, it subjects the welding electrodes to a current of a constant level during a welding time extension that follows on from the set welding time, dependent on a magnitude of the control deviation that is measured at the point in time of the elapse and/or during the set welding time.

According to at least one embodiment, during the set welding time, the welding control subjects the two welding electrodes to a differing current level, depending on the magnitude of the control deviation, the current level being kept constant during the incremental time frames. To this extent, the welding points can be monitored by way of the welding control, for example continuously, already during the welding within the set welding time. If there is a deviation from an ideal value, that is to say if there is a control deviation of greater than zero, the welding control can for example subject the welding electrodes to a higher current level, in order to heat up welding points more intensely or to thicken the welding points already during the set welding time. Keeping the current level constant during such an incremental time frame therefore allows the welding control to calculate and store the measured absolute value of and/or the increase in the measured force particularly easily, whereby particularly rapid and real-time control by the welding control can take place.

According to at least one embodiment, a variation of the actual force over time during the set welding time that is stored by the welding control is compared by the welding control with a set variation stored in the welding control and, depending on the resultant control deviation, a length of the welding time extension and/or a current level during the welding time extension is controlled and determined by the welding control. Such a set variation may correspond to the reference curve already stored in the welding control. Then, that is to say in the case of the reference curve, the set variation is for example a force-time curve and/or a force-current curve. Thus, the greater a deviation of the actual variation from the set variation is, the longer a welding time extension may be made.

According to at least one embodiment, the force sensor is arranged on welding tongs or on a drive of welding tongs and is connected to an analog input of the welding control. Such a force sensor arranged at least in the region of the welding tongs can therefore measure the force between the two welding electrodes and pass it on to the analog input of the welding control as directly as possible, and for example without the use of additional transmission elements.

According to at least one embodiment, the current level of the current during the welding time extension is at least 0.7 times and at most 1.3 times, with preference at least 0.8 times and at most 1.2 times, the current level applied to the welding electrodes at the point in time of the elapse of the set welding time. In particular, the current level during the welding time extension may be that current level that was applied to the welding electrodes at the point in time of the elapse of the set welding time. To this extent, the least possible control effort is required from the welding control during the welding time extension, since control parameters that are necessary for such a welding time extension are already known to the welding control during the set welding time. Therefore, during the welding time extension, the welding time is extended with as little effort as possible, by for example retaining the current level without for example having to modulate a current level during the welding time extension in a way that involves a degree of effort.

According to at least one embodiment, the incremental time frames have a duration of at least 700 ms and at most 1300 ms, with preference at least 800 ms and at most 1200 ms. In particular, the duration of the incremental time frame may be precisely 1 ms. Such a duration ensures on the one hand that an effective, that is to say continuous, control of for example the current level by the welding control takes place and on the other hand that a monitoring of the welding points by the welding control can be accomplished with as little effort as possible. In particular, the welding control may measure the force at the welding electrodes after the elapse of at least 350 ms. It has been found that a measuring cycle set to such a time is particularly practicable with respect to effort and costs for the welding control.

According to at least one embodiment, a spatter detection is carried out during the set welding time, checking whether welding spatter has occurred by means of an inspection means in an incremental time frame of at least 700 ms and at most 1300 ms, with preference at least 800 ms and at most 1200 ms. In particular, an inspection may be performed every 1000 ms. For example, welding spatter occurs at points where there is excessive heat or points that are subjected to excessive force by the welding electrodes. Thus, if such welding spatter is detected by the inspection means, the latter can for example, by activating the welding control, increase the welding current and extend the welding time in order to compensate for the energy loss that is caused for example by welding spatter. In particular, the point in time and/or the magnitude and/or the effect of the first and/or subsequent welding spatter may be a measure of the length of the welding time extension. It may be for example that the more welding spatter has occurred, the longer the welding time extension lasts. Such continuous monitoring for possible welding spatter therefore represents an additional, particularly simple and inexpensive possibility for monitoring and inspecting the quality of the respective welding points.

According to at least one embodiment, when welding spatter is detected, the inspection means is designed and provided such that it continues the welding operation with a current adjustment sequence that is characteristic of such a detection. For example, such a current adjustment sequence comprises an increase in the welding current. In other words, "characteristic" therefore means that such a current adjustment sequence is adapted for example to the point in time and/or the magnitude and/or the effect of the first and/or subsequent welding spatter and/or is made dependent thereon.

According to at least one embodiment, a control function of the welding control and/or a detection function of the inspection means can be set and/or can be activated by means of an operating element. In particular, the operating element may be an input screen, for example a touchscreen or a computer. To this extent, both the welding control and the detection function can be set by means of the operating element to correspond to a desired quality of the welding points on the aluminum, depending on the needs for example of vehicle body construction.

In addition, a welding device for the welding of aluminum is provided. For example, the welding device described here may be operated by means of the process described here, as is described in conjunction with one or more of the aforementioned embodiments. That is to say that the features presented for the welding process described here are also disclosed for the welding device described here, and vice versa.

According to at least one embodiment, the welding device for the welding of aluminum comprises at least one force sensor, by means of which a force between two welding electrodes on aluminum elements to be welded can be measured and by means of which the measured force values can be transmitted to a welding control, wherein, up to the elapse of a set welding time, it is possible by means of the welding control to calculate in each case during and/or after the elapse of predeterminable incremental time frames at least one absolute value and/or at least one increase in the measured force and to store it, and wherein it is possible by means of the welding control to compare the measured absolute value or the increase in the measured force in each case with a reference value and/or a reference curve and to calculate a control deviation resulting from the comparison. The welding control is provided and designed such that, after the elapse of the set welding time, it subjects the welding electrodes to a current of a constant level during a welding time extension that follows on from the set welding time, dependent on a magnitude of the control deviation that is measured at the point in time of the elapse and/or during the set welding time.

In this case, the welding device for the welding of aluminum has the advantages and properties that have already been mentioned in connection with the welding process.

BRIEF DESCRIPTION OF THE DRAWINGS

The welding process described here and the welding device described here are explained in more detail below on the basis of exemplary embodiments and the associated figures.

DETAILED DESCRIPTION

Figure 1:
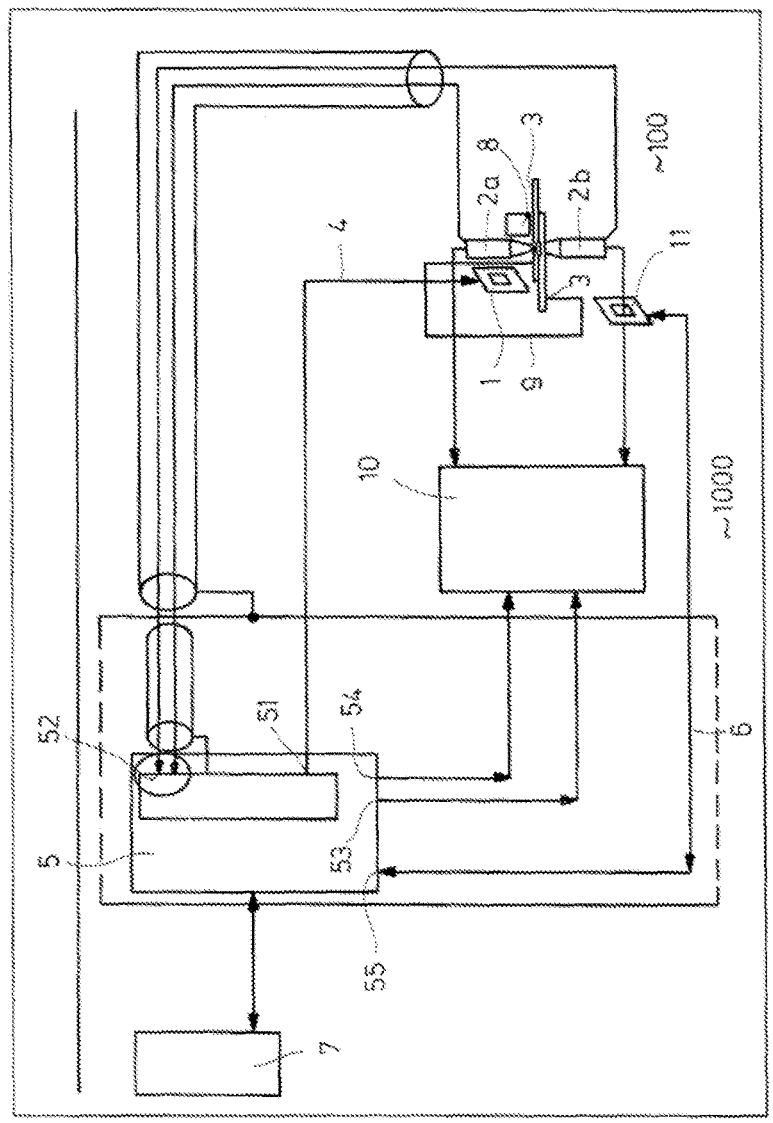
FIG. 1 shows in a schematic representation a welding device described here and a welding process described here that is carried out by the welding device described in this figure.

The welding device 1000 represented in FIG. 1 for the welding of aluminum comprises a force sensor 1, by means of which a force between two welding electrodes 2a, 2b on aluminum elements 3 to be welded can be measured and by means of which the measured force values can be transmitted to a welding control 5.

Moreover, up to the elapse of a set welding time, the welding control 5 is used to calculate in each case during and/or after the elapse of predeterminable incremental time frames at least one absolute value and/or at least one increase in the measured force and respectively store it, wherein it is possible by means of the welding control 5 to compare the measured absolute value and/or the increase in the measured force in each case with a reference value and/or a reference curve and to calculate a control deviation resulting from the comparison.

In particular, the welding control is provided and designed such that, after the elapse of the set welding time, it subjects the welding electrodes to a current of a constant level during a welding time extension that follows on from the set welding time, dependent on a magnitude of the control deviation that is measured at the point in time of the elapse and/or during the set welding time. In particular, in the exemplary embodiment according to FIG. 1, the force sensor 1 is arranged on welding tongs 9, the force sensor 1 being connected to an analog input 51 of the welding control 5 and transmitting its measured values 4 to said input. Depending on the sensor connected, the connection 51 may be parameterized by way of an operating element 7.

By way of such an operating element 7, an activation of the control function of the welding control 5 is performed, it being possible by way of such an operating element for a control function of the welding control 5 for the material aluminum to be performed by way of setting a version of the operating mode. Such a version of the operating mode is set to the value "aluminum".

In addition, a transformer 10 for voltage transformation is connected in series between the welding control 5 and the welding electrodes 2a, 2b. The transformer 10 is activated by way of voltage connections 53 and 54 of the welding control 5 or is subjected to a predeterminable voltage by way of these connections. Moreover, a current sensor 11 sends its measured values 12 to a measuring input 55 of the welding control 5.

During the welding sequence, that is to say during the set welding time, in every half-wave (500 µs) the force signal is measured by way of the analog interface 51. The measured force values are scaled, averaged and stored in the welding control 5.

In the present exemplary embodiment, the length of each incremental time frame is precisely one millisecond. During or at the point in time of the elapse of each incremental time frame, the absolute value of the force and the increase in the force variation are calculated for a predeterminable time period. Depending on in which time period of the welding sequence the welding device 1000 is, control is performed on the basis of the absolute value, the increase or a combination of the two. For this purpose, an actual value is compared with the corresponding value from a reference curve, likewise stored in the welding control 5 and/or the welding device 1000, and the control deviation is determined from this comparison. A change in the current level is calculated from this difference and passed on to a lower-level controller. The calculated change in current level is monitored for parameterized limits (min., max.) and set as the new current value during the set current time.

Moreover, a spatter detection is carried out by the welding device 1000 during the welding process 100 by means of an inspection means 8, here too the inspection means 8 inspecting in a time frame of precisely one millisecond whether welding spatter has occurred. If this is the case, the control function described above is interrupted and a current adjustment sequence that is characteristic of such a detection of welding spatter is carried out, the welding operation being resumed after the elapse of the current adjustment sequence. For this purpose, there are likewise parameters in the operating element 7 that the user can use. As already mentioned above, if the predeterminable parameterized set welding time is reached within the welding process, the function for determining the welding time extension is carried out. For this purpose, firstly, before the elapse of the set welding time, the existing actual variation of the force signal is compared with the variation of the reference curve. This difference is used to calculate a time extension, which is added on to the set welding time. In the present case, the welding time extension follows on directly after the set welding time. During this time extension, the welding current last used is constantly maintained, the calculated time extension being monitored for at least one parameterized limit (min., max.). Both the control function of the welding control 5 and the inspection means 8 can be set and activated by means of the operating element 7.

Figure 2:
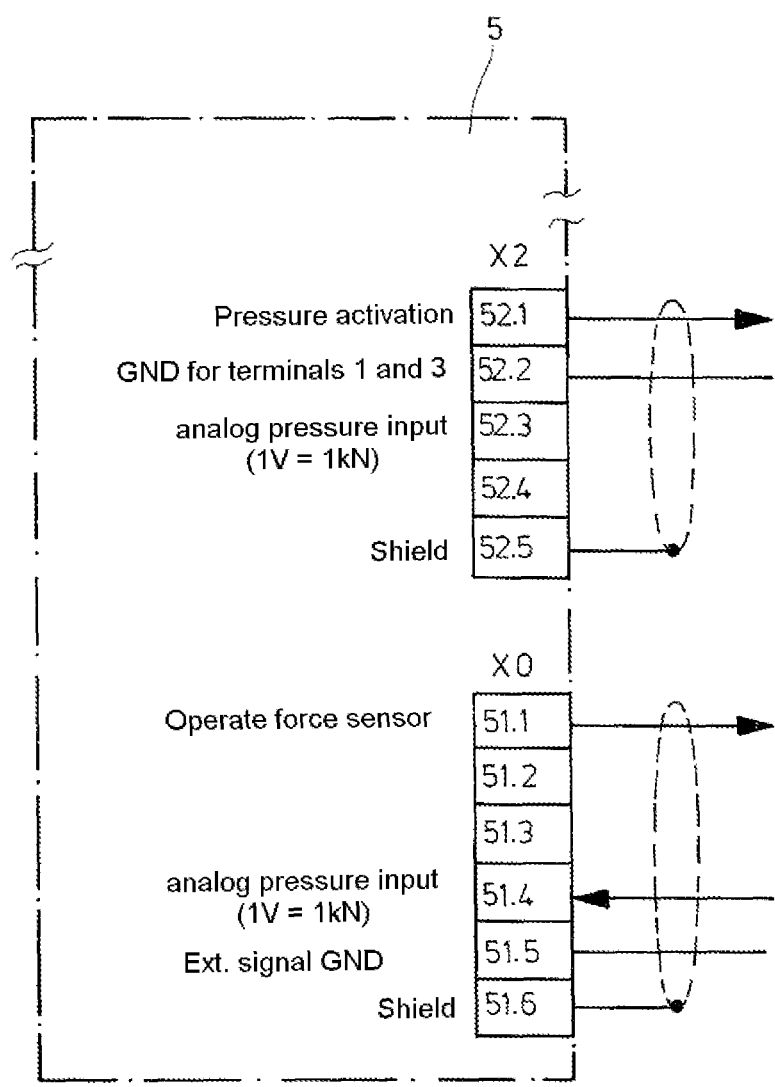
FIG. 2 shows in a schematic representation an exemplary embodiment of a welding control described here.

In FIG. 2, the welding control 5 shown in FIG. 1 is represented more clearly. In particular, FIG. 2 shows the connection of the force signal to the welding control 5; that is to say, how the force signal is to be connected to the connector X9 in order to allow it to be measured in the control. It can be seen that the welding control 5 has sub-connections 52.1 to 52.5, the function of which is self-evident from the figure. Moreover, it can be seen that an actual force value is measured by the force sensor 1 and transmitted to the analog input 51, and in particular the sub-connection 51.4. Furthermore, the force sensor 1 is operated in its functional capability by way of the sub-connection 51.1. Altogether, the force sensor 1 is therefore connected to the welding control 5 by means of the sub-connections 51.1 to 51.6.

The disclosure is not restricted to the description on the basis of the exemplary embodiments. Rather, the disclosure includes any novel feature and any combination of features, which includes in particular any combination of features in the patent claims even if this feature or this combination is not itself explicitly specified in the patent claims or in the exemplary embodiments.

The invention claimed is:

1. A welding process for welding aluminum, comprising:
   operating welding electrodes for a set welding time to weld aluminium elements;

during the set welding time, measuring a force between the welding electrodes on the aluminum elements to be welded with at least one force sensor and transmitting the measured force to a welding control;

until the set welding time elapses, calculating and storing with the welding control at periodic time intervals at least one of (i) at least one absolute value of the measured force and (ii) at least one increase in the measured force;

calculating with the welding control a control deviation between the at least one of the at least one absolute value and the at least one increase in the measured force in each case and at least one of a reference value and a reference curve;

determining (i) a duration of a welding time extension is to follow the set welding time based on a magnitude of the control deviation, and (ii) a magnitude of a constant current to be applied during the welding time extension based on the magnitude of the control deviation; and after the elapse of the set welding time, subjecting the welding electrodes to the determined constant current for the determined duration of the welding time extension.

2. The welding process according to claim 1, further comprising: during the set welding time, subjecting the welding electrodes to a differing current level, depending on the magnitude of the control deviation, the differing current level being kept constant during each periodic time interval.

3. The welding process according to claim 1, wherein: one of the at least one force sensor is arranged on one of welding tongs and a drive of welding tongs, and another one of the at least one force sensor is connected to an analog input of the welding control.

4. The welding process according to claim 1, wherein the magnitude of the constant current during the welding time extension is at least 0.7 times and at most 1.3 times a magnitude of a current applied to the welding electrodes at a point in time of the elapse of the set welding time.

5. The welding process according claim 1, wherein the periodic time intervals have a duration of at least 700 ms and at most 1300 ms.

6. The welding process according to claim 1, further comprising:

performing a spatter detection in during the set welding time using an inspection device to check whether welding spatter has occurred, the spatter detection being performed periodically at least every 700 ms and at most every 1300 ms.

7. The welding process according to claim 4, wherein the magnitude of the constant current during the welding time extension is at least 0.7 times and at most 1.3 times a magnitude of a current applied to the welding electrodes at a point in time of the elapse of the set welding time.

8. A welding process according to claim 6, further comprising:

upon detection of welding spatter, continuing the welding operation with a current adjustment sequence that is characteristic of the detection.

9. The welding process according to claim 6, further comprising:

setting and/or activating at least one of a control function of the welding control and a detection function of the inspection device with an operating element.

10. The welding process according claim 5, wherein the periodic time intervals have a duration of at least 800 ms and at most 1200 ms.

11. The welding process according claim 6, wherein the spatter detection is performed periodically at least every 800 ms and at most every 1200 ms.

* * * * *